Sept. 21, 1954   J. L. FERGUSON ET AL   2,689,676
METHOD OF MEASURING AND FILLING ACCURATELY DETERMINABLE
AMOUNTS OF PRODUCTS OF WIDELY VARYING CHARACTER INTO
CONTAINERS AND APPARATUS FOR PRACTICING THE SAME
Filed Dec. 10, 1947   10 Sheets-Sheet 4

INVENTORS.
John L. Ferguson
Richard C. Talbot.

Sept. 21, 1954       J. L. FERGUSON ET AL           2,689,676
   METHOD OF MEASURING AND FILLING ACCURATELY DETERMINABLE
    AMOUNTS OF PRODUCTS OF WIDELY VARYING CHARACTER INTO
       CONTAINERS AND APPARATUS FOR PRACTICING THE SAME
Filed Dec. 10, 1947                          10 Sheets-Sheet 5
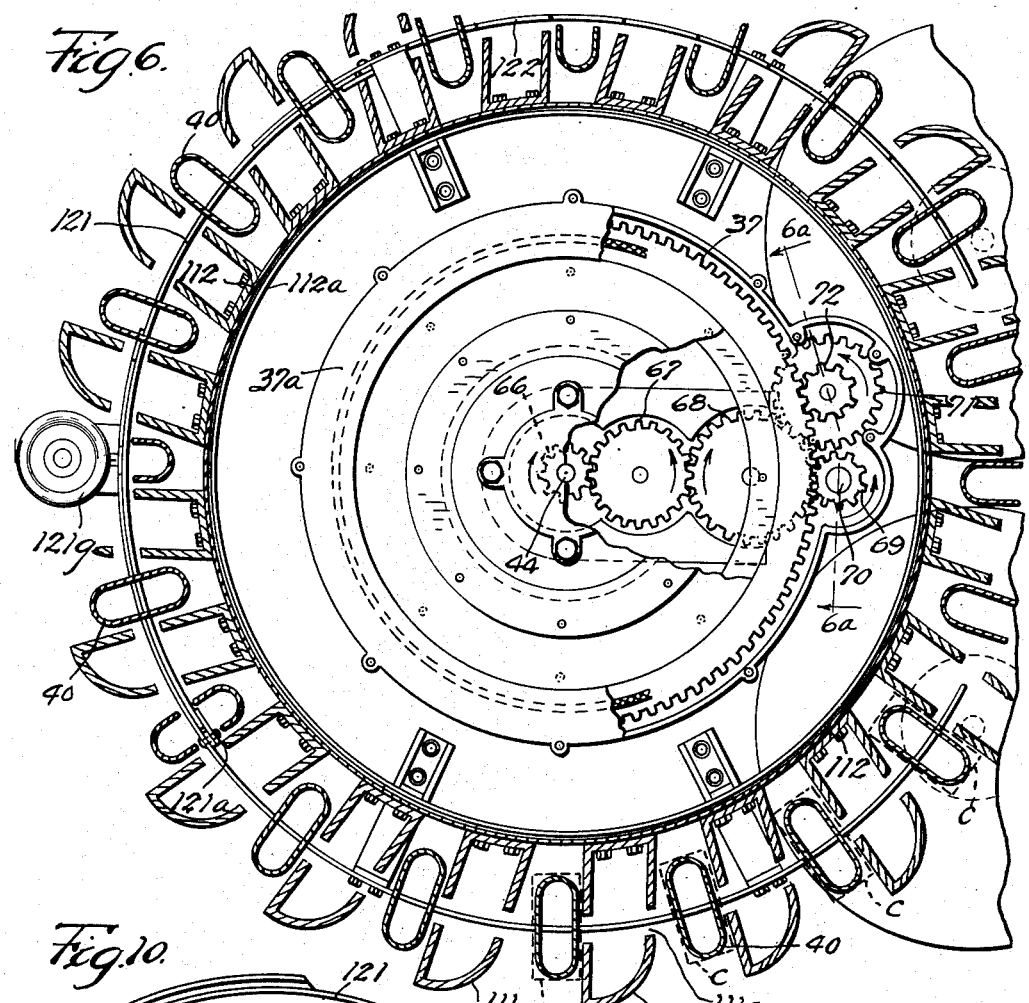
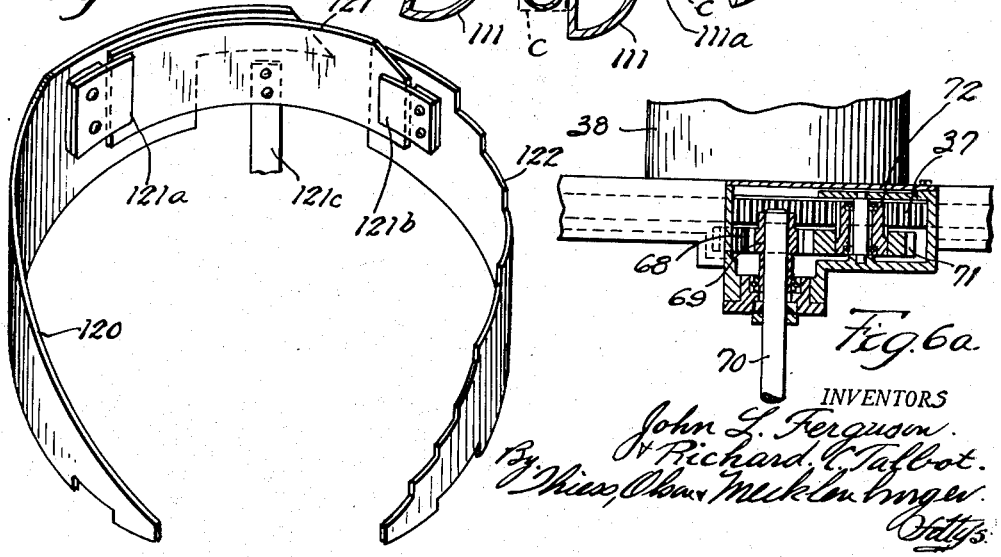
INVENTORS
John L. Ferguson
Richard C. Talbot

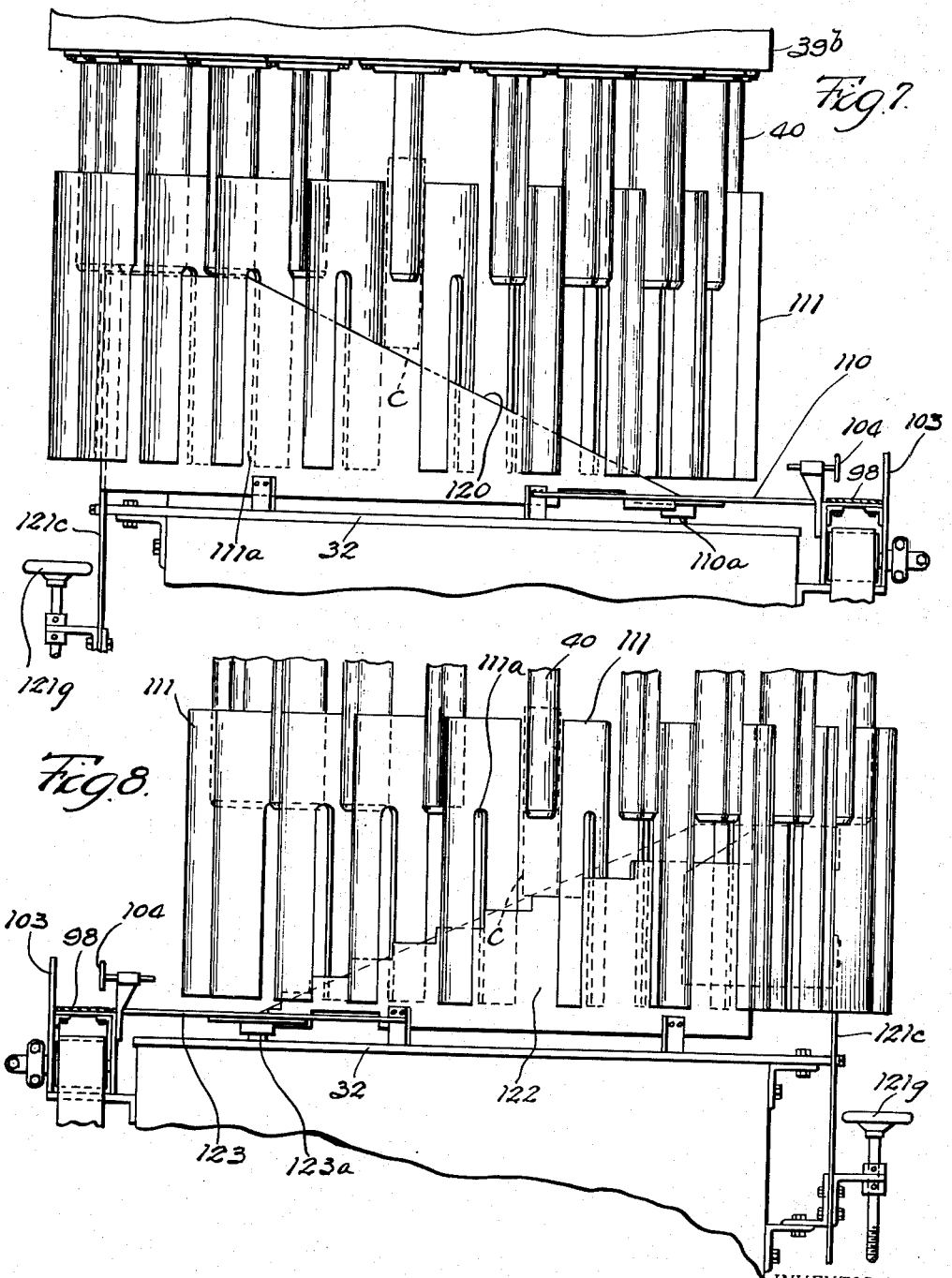

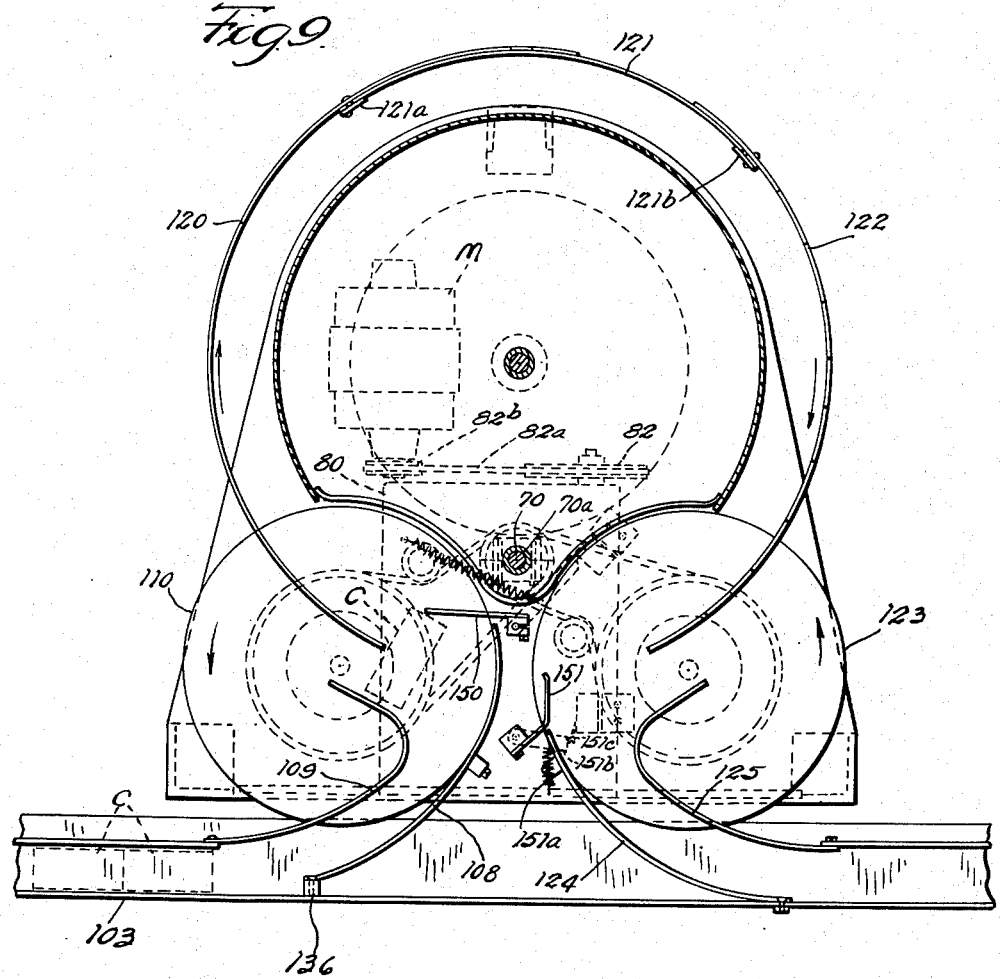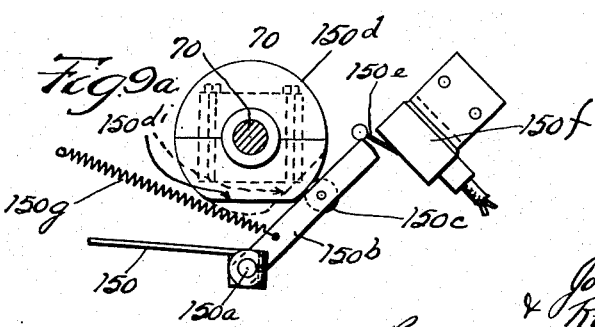

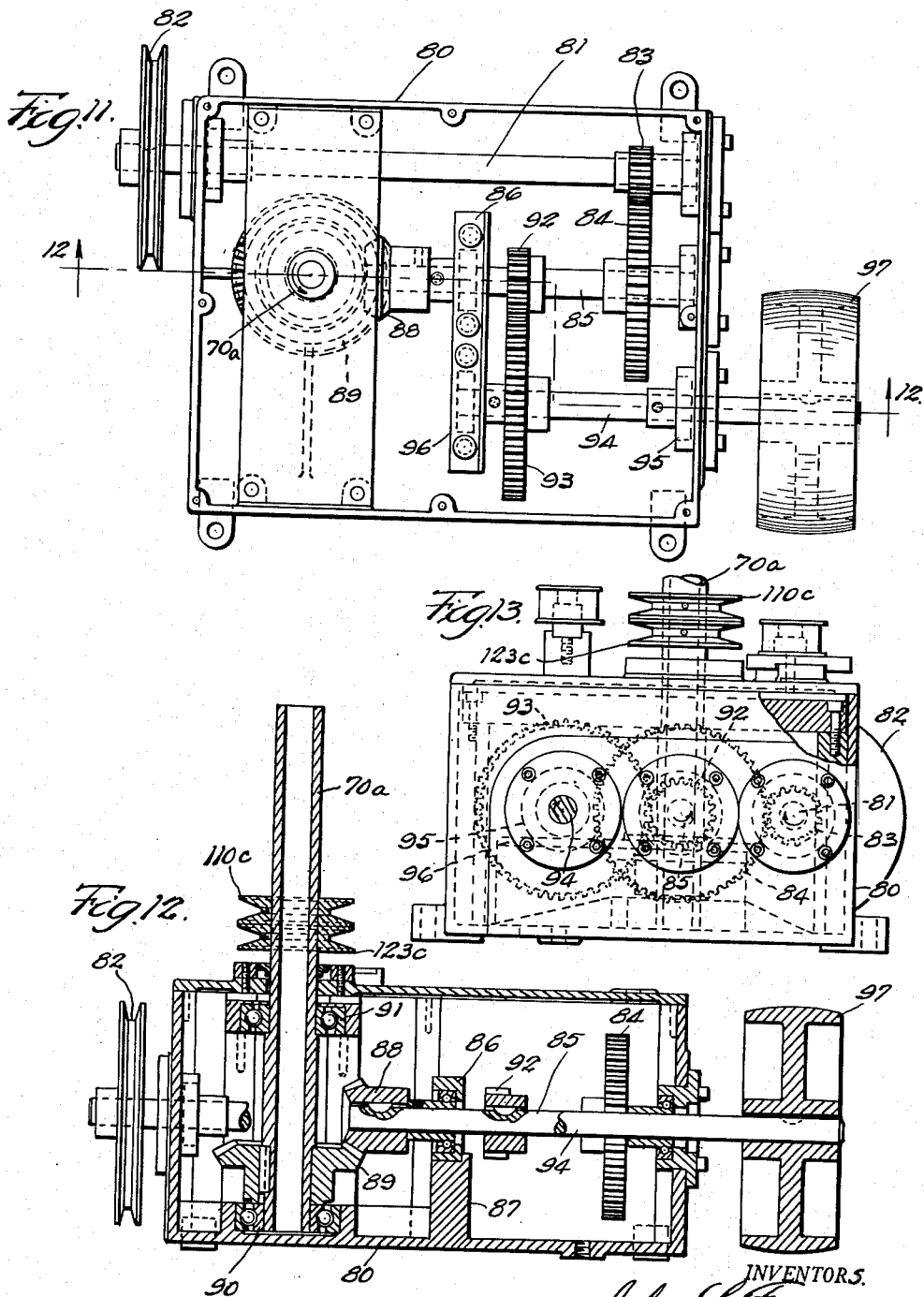

Sept. 21, 1954    J. L. FERGUSON ET AL    2,689,676
METHOD OF MEASURING AND FILLING ACCURATELY DETERMINABLE
AMOUNTS OF PRODUCTS OF WIDELY VARYING CHARACTER INTO
CONTAINERS AND APPARATUS FOR PRACTICING THE SAME
Filed Dec. 10, 1947                              10 Sheets-Sheet 9
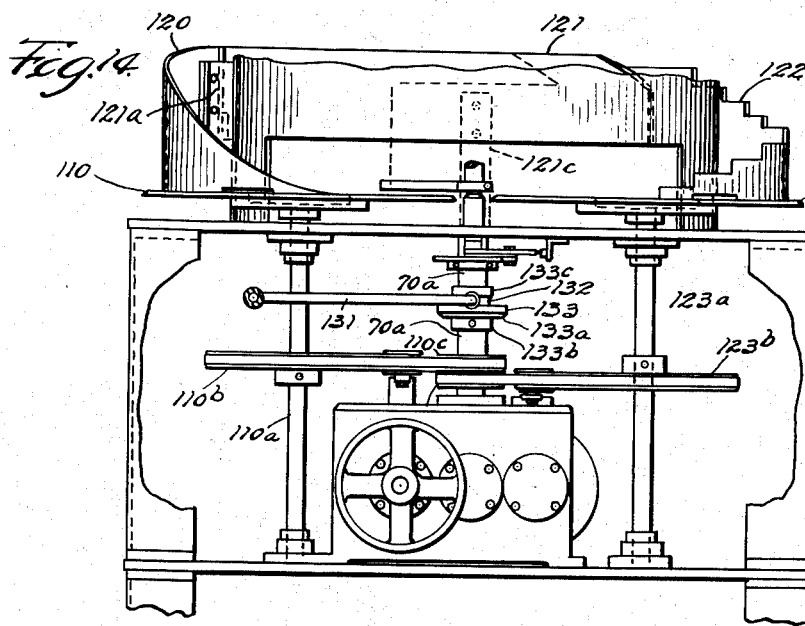
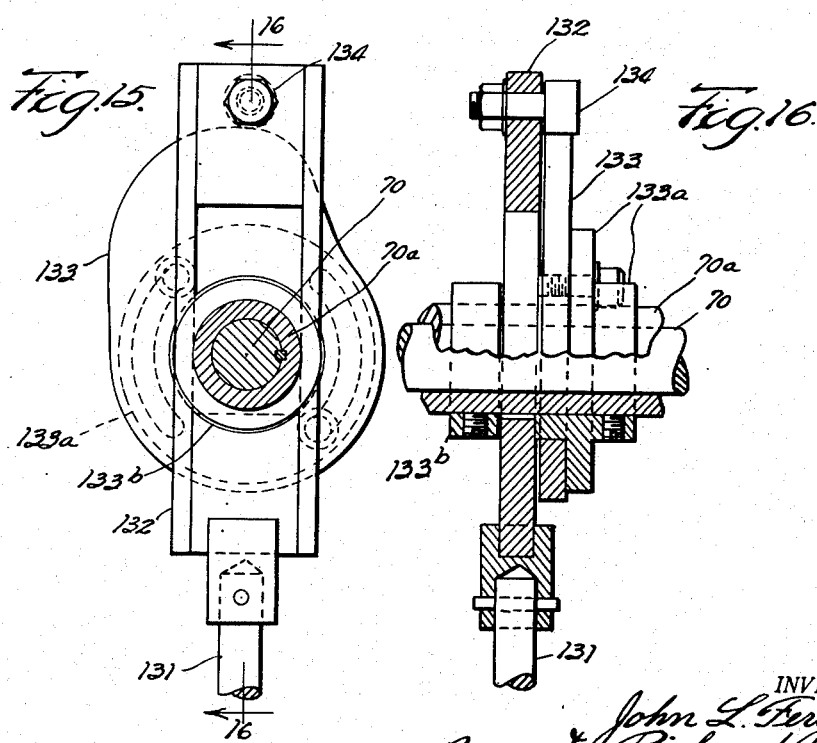
INVENTORS.
John L. Ferguson
& Richard C. Talbot Sept. 21, 1954   J. L. FERGUSON ET AL   2,689,676
METHOD OF MEASURING AND FILLING ACCURATELY DETERMINABLE
AMOUNTS OF PRODUCTS OF WIDELY VARYING CHARACTER INTO
CONTAINERS AND APPARATUS FOR PRACTICING THE SAME
Filed Dec. 10, 1947                                  10 Sheets-Sheet 10
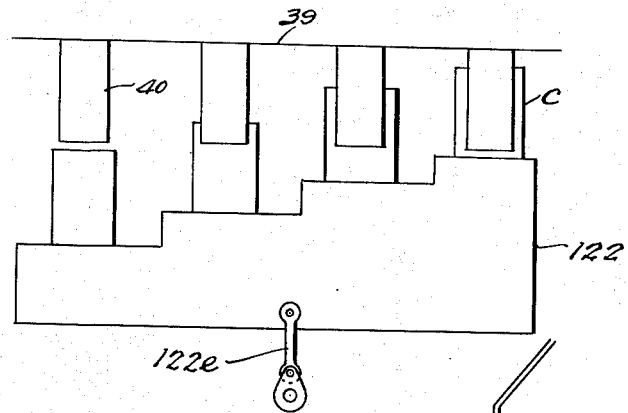
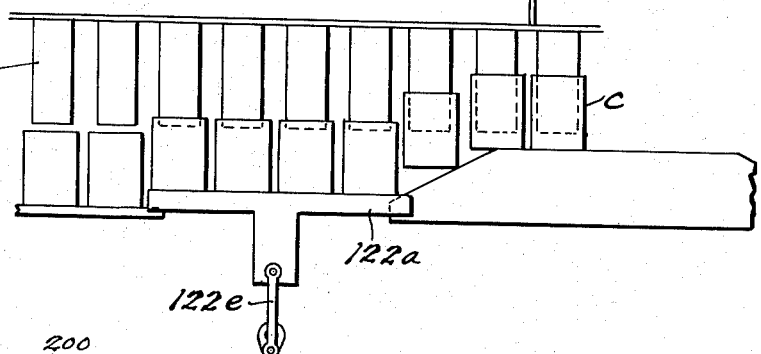
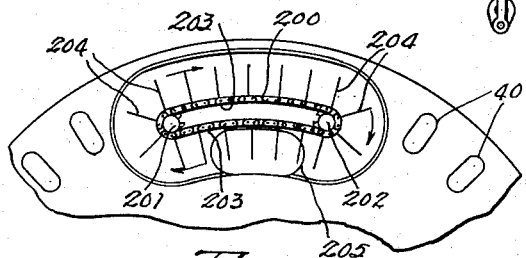
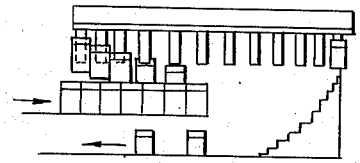
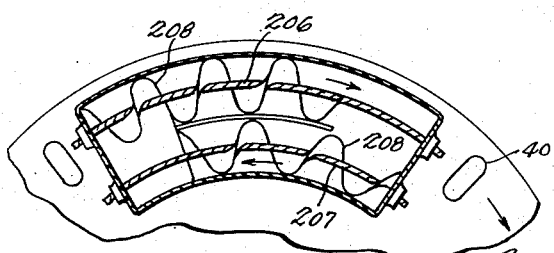
INVENTORS.
John L. Ferguson
Richard C. Talbot Patented Sept. 21, 1954

2,689,676

UNITED STATES PATENT OFFICE 2,689,676

METHOD OF MEASURING AND FILLING ACCURATELY DETERMINABLE AMOUNTS OF PRODUCTS OF WIDELY VARYING CHARACTER INTO CONTAINERS AND APPARATUS FOR PRACTICING THE SAME

John L. Ferguson and Richard C. Talbot, Joliet, Ill., assignors to J. L. Ferguson Company, Joliet, Ill., a corporation of Illinois Application December 10, 1947, Serial No. 790,814

38 Claims. (Cl. 226—71)

This invention relates to filling machines, and includes the method of measuring the product handled by such machine wherefrom a novelly more accurate measurement of the product is secured.

Broadly speaking, the machine includes means for feeding empty containers or cans beneath a series of measuring tubes and telescopically moving these containers upwardly to project the measuring tubes into the containers from the tops of the latter. The novel measuring method involves controlling the manner in which the product is fed, to the end that products of various characteristics may be properly measured out and filled despite said varying characteristics. Following the telescopic projection of the measuring tube into an associated container to a predetermined depth, the material or product is fed into the measuring tube until the latter is filled. It will be understood that the containers and measuring tubes projecting thereinto are continuously cyclically moved rotatably during the various herein described operations. After the tube has been filled, the cans are lowered to permit the withdrawal of the measuring tubes therefrom with the concurrent feeding into the cans of the material contained in the measuring tubes.

It has been discovered that the depth to which the measuring tubes project downwardly into the containers (following an initial period during which the bottom of the tube is maintained against the bottom of the empty can) may be varied to more accurately insure the measuring and filling into the cans of products of various characteristics. The method involved in the hereinafter described filling procedure includes, the maintenance of the open lower end of the measuring tube against the bottom of the empty container while some material is being supplied into the tube, then lowering the bottom of said container to permit an initial supply of material to flow from the measuring tube to the container in an amount just sufficient to flow out of the bottom of the tube and seal the bottom open end of said tube while the latter is being completely filled to measure a predetermined amount of product for subsequent filling into the container.

In other words, the bottoms of the measuring tubes may be closed at first by projecting them downwardly far enough, i. e., by elevating the containers high enough so that the bottoms of the containers seal the bottoms of the measuring tubes. Thereafter it has been found desirable deliberately to cause the open lower end of the measuring tube to be positioned slightly above the bottom of the empty container during a further tube filling period so that the product flows out into the container and because of piling up around the lower end of the tube seals off any further flow of material from the tube into the container until the tube after being wholly filled progresses to a container lowering point, allowing said container to withdraw telescopically downwardly which causes the tube-full of product to be fed into the can. By varying the depth to which the measuring tubes project into the containers during the second phase of the operation when the product flowing into the container seals the tube outlet to prevent further deposit of product into the container even though the tube becomes completely full during this phase, a method of controlling the accurate measuring and desirable filling of products of different characteristics is secured irrespective of the variations in said products.

For instance, some materials settle or pack more tightly than others. In order, therefore, to insure the deposit of the required measured quantity into each can, a method of control must be available whereby a greater or less amount of sealing material (the product) is permitted to flow out of the bottom of the measuring tube into the can before the measuring tubes are ultimately completely filled with a definite cubical content of product, i. e., the further the tube bottom is positioned above the can bottom the more product is required to build up the seal wherefrom the total ultimate amount of material which is placed in each can (remembering that the measuring tube is completely filled in all cases—following the deposit of the sealing amount of material—before the can-filling upward movement of the tube occurs) is accurately controlled as dictated by predetermined factors.

Thus, following the filling of the measuring tubes, the containers and the tubes are separated to permit the material in the tubes to flow freely into the containers, and the latter are ultimately withdrawn entirely from telescoping relation with the measuring tubes. The filled containers are bumped down a series of steps as they are thus withdrawn from said telescoping measuring tube association. This operation causes the material, as it flows into the containers from the tubes, to settle or pack, the degree of such packing being controllable by the number of steps down which the containers are dropped and/or by the height of each step, i. e., by the violence of the packing or shaking movement.

The method of filling in accordance with the herein-described invention also includes tamping the product as it progressively flows into the container and accomplishes this by relative movement between the can being filled and the filling spout or measuring tube. It will be understood that while the measuring tube is used for tamping in the hereafter described apparatus, the novel method may be accomplished by causing relative movement between a container and any product supplying means which may be projected into the can during the filling of the latter.

Various pertinent and associated features of novelty in the hereinafter described apparatus will be referred to specifically as the description of said apparatus, and the method of procedure employed in connection therewith, is developed by reference to the accompanying drawings in which latter—

Fig. 1a is a diagrammatic sectional elevational and fragmentary view of containers in three variant tube-fillable positions in the Fig. 1 machine;

Fig. 1b is a perspective fragmentary view of a measuring tube which may be used in the Fig. 1 machine;

Fig. 6 is a plan sectional view taken on the line 6—6 of Fig. 3, the portions of certain horizontally-extending cover plates being broken away, the more clearly to illustrate the intermeshing of certain operating gears;

Fig. 6a is a fragmentary elevational, partially-sectioned view of certain gears shown in Fig. 6;

Fig. 7 is an elevational view—taken from the left hand end of Fig. 1—of the measuring tube and can progressing elements of the machine;

Fig. 8 is a view similar to Fig. 7, but taken from the right hand end of Fig. 1;

Fig. 9 is a plan view of the infeed and outfeed assemblies of the machine as these are associated with the can elevating and lowering cam track, all of the operating and filling instrumentalities above the plane of the elements shown being omitted for clarity;

Fig. 9a is an enlarged plan view of certain of the elements of Fig. 9;

Fig. 10 is a perspective view of the can elevating and lowering track sections;

Figs. 11, 12 and 13 are plan, end elevational and side elevational views respectively (largely in section) of the gear box containing the operating instrumentalities for transmitting the power supply to the moving parts of the apparatus; this gear box also being shown in the lower right hand corner of the machine of Fig. 3;

Fig. 14 is an elevational view taken approximately on the line 14—14 of Fig. 3, the three can cam track sections depicted in Fig. 10 being included;

Fig. 15 is a plan view of a package feed control cam shown in elevation in Fig. 14;

Fig. 16 is a sectional view taken on the line 16—16 of Fig. 15;

Fig. 17 is a diagrammatic elevational view of the container filling portion of the machine illustrating a novel filling method;

Fig. 18 is a view similar to Fig. 17 wherein the method is accomplished with somewhat different apparatus;

Figs. 19 and 20 illustrate modifications of the product power feed portion of the machine; and Fig. 21 illustrates a modification of the inlet and outlet conveyor portion of the machine.

Figure 1:
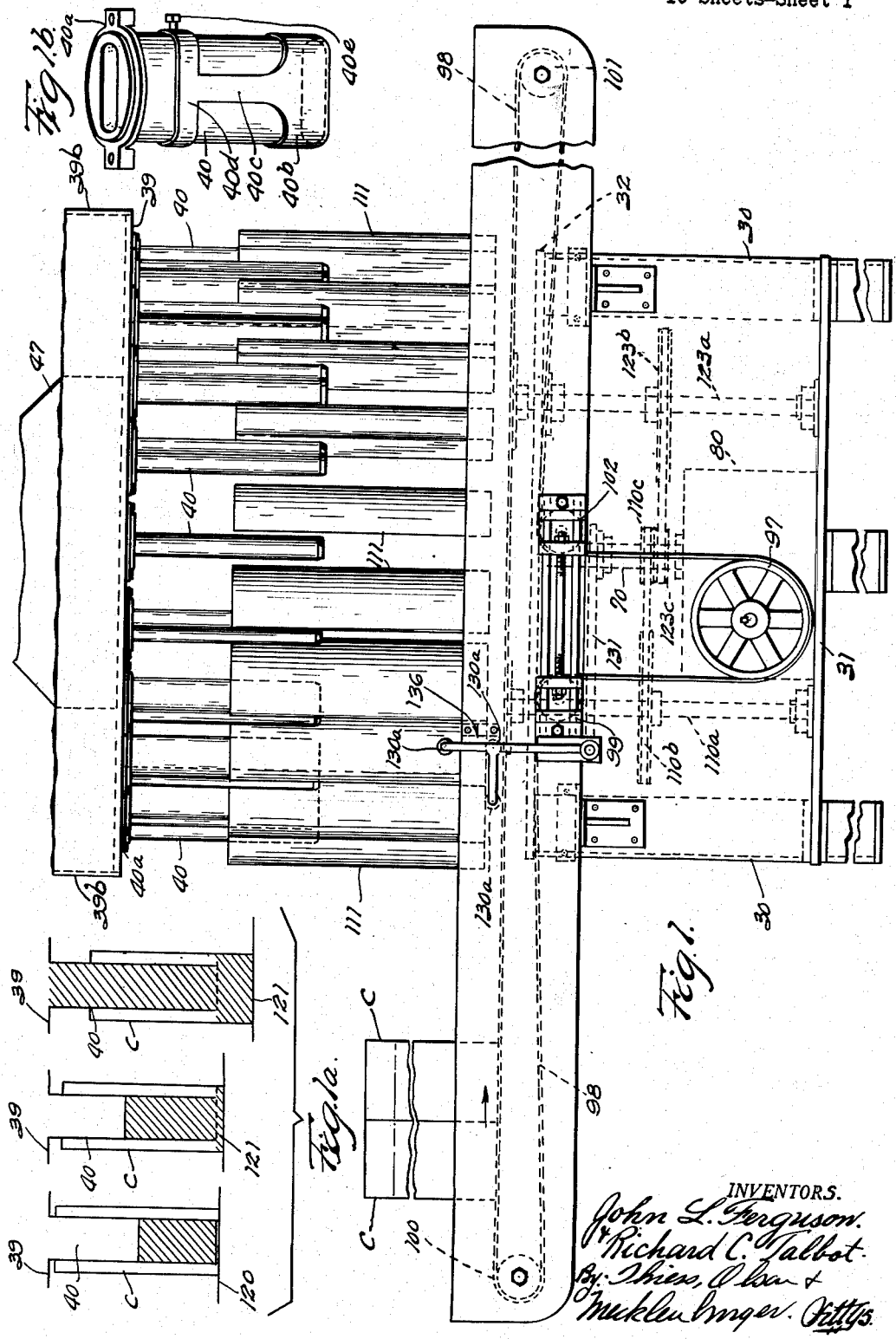
Fig. 1 is a side or front elevational view of the apparatus taken from the conveyor side of the machine, i. e., what may be termed the front of said machine where the unfilled packages are fed to the filling mechanism and the filled packages are withdrawn therefrom.

The apparatus comprises supporting legs or columns 30 upon which horizontally extending bed plates 31 and 32 are supported. A center post guide 33 extends between said plates 31 and 32 and forms a sleeve in which a center post or supporting column 34 is adjustably vertically mounted. The latter is adjustable vertically by movement of the threaded adjusting screw 35, the upper end of which is threaded in adjusting nut 35a at the bottom of post 34 and the lower end of which is rotatably associated with thrust ball bearing 35b which latter is retained by bearing retainer 35c.

A casing or feeder housing 36 is secured to the top of supporting post 34 and encloses certain hereafter to-be-described operating gear and pinion mechanism. A gear ring 37 located within the casing 36 carries a hub 38 on the upper end of which latter is mounted measuring tube carrying disc 39, from which latter depend a plurality of measuring tubes 40; each measuring tube is provided with a securing flange 40a, to enable ready connection of measuring tubes of different sizes in depending relation on the under side of the carrying disc 39. These tubes are carefully designed for differently cross-sectioned containers so that the tube may substantially fill the container transversely and are sized to provide the proper number of cubic inches in interior volume dependent upon the weight of the product to be filled. They are, of course, therefore, of varying cross-sectional shape according to the container for which machine is intended. The tubes are also changeably dependent on the product which is to be handled. The alternativeness of all of these factors enables an exceptionally close predetermination of the product supplied by the tubes. Bearing cartridges 41—41 carrying upper and lower bearings 42—42 which rotatably support the hub 38 and the members which are attached thereto to be rotatably carried about the indicated vertical axis.

Hub 38 is provided with a securing flange 38a, permitting attachment of the hub to the rotatable disc 39, and a lower horizontally-extending flange 38b to which the gear ring 37 is fixedly secured to rotate said hub. The ring gear is overlaid by a gear housing cover and sealing ring 37a, which together with the lower lip 38b of the hub 38 closes the upper side of the gear casing 36.

The bearing cartridges 41—41 are fixed to a spindle 43 within which vertically extends a rotatable feeder drive shaft 44. The member 43 carries a sprocket and gear containing casing or feeder drive housing 45 which in turn supports, in depending relation, a supply chamber or feeder housing 47 the walls of which extend vertically downward into scraping relation to form a feeder or product supply enclosure with the measuring tube carrying disc 39. The latter is located so that it may be rotatably swept under the feeder housing 47 to bring the upper open ends of the measuring tubes 40 into product receiving position under said housing. A top cover plate 47a closes the open upper side of feeder gear and sprocket housing 47b.

A product supply assembly is mounted above and in communication with the housing 45. This assembly comprises a casing 48 containing two oppositely directed screw conveyors 49 and 50. The product is fed into the casing 48 through a vertical conduit 51, connected overhead to any desirable source of product supply. As the product passes downwardly through conduit 51, it is picked up and fed to the left (see Figs. 2 and 3) to drop down through opening 52 and connecting conduit 53 into feeder housing or chamber 47. When chamber 47 is full, further overflow supply thereto by screw conveyor 49 is received by conveyor 50 at the opposite end of which paddles 50a direct the product transversely to the right hand end of conveyor 49, which again carries it to the left.

One outstanding desideratum in an apparatus wherein an accurately measured amount of product is first segregated in a measuring tube is the maintenance of a constant uniform head and pressure of product at the point of supplying the product into each measuring tube. Otherwise, the uniform product-measuring function of each tube cannot be insured. Such head and pressure maintenance has long been sought for, but it is common knowledge that it has not heretofore been achieved. However, this constant uniform head and pressure of product maintenance at point of filling into the measuring tubes in order to obtain and maintain uniform measurings has definitely been accomplished in the instant novel apparatus by means of the circulating feeder or oppositely directed screw conveyors 49 and 50. Conveyor 49 is regulated by changeable speed drive to deliver only slightly more product than required when operating the machine at a given capacity. The small excess product is then returned to conveyor 49 by conveyor 50. This important feature for successful operation of the instant machine is covered in the claims. While automatic controls for stopping and starting a feed conveyor and similar means may have been employed in the past, such means do not produce and maintain the constancy in head and pressure of product which is required.

Figure 4:
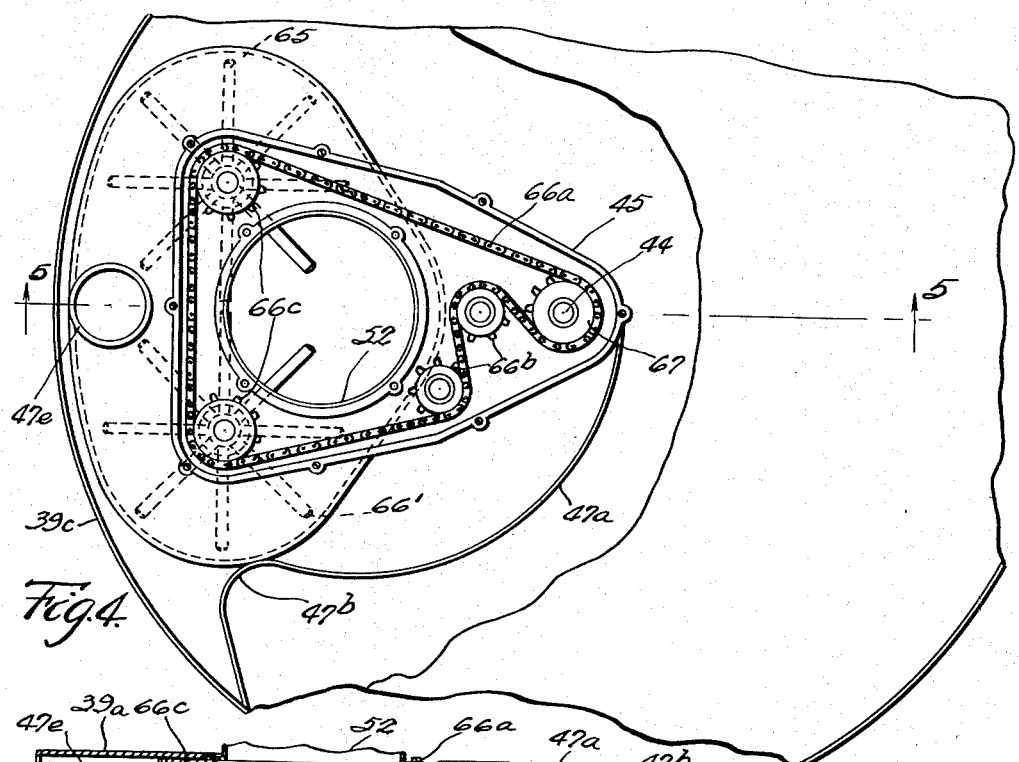
Fig. 4 is a plan view taken on the line 4—4 of Fig. 3, the elements in this view being enlarged as compared with the same elements shown in Fig. 3.

Motor 60 through belt 61 and gears 62, 63 and 64 operates the screw conveyors 49 and 50 located in casing 48. After the product has passed into the interior of feed chamber 47, it is continuously moved by agitators 65 and 66' (Fig. 4) which are rotated by the operation of chain 66a and idler sprockets 66b and agitator sprockets 66c (best shown in Fig. 4) from feeder drive sprocket 67 which is secured to the top of feeder drive shaft 44. This supply housing 47 is provided with an overhead and upwardly-directed vent 47e which may be connected to a vacuum dust collector.

Figure 3:
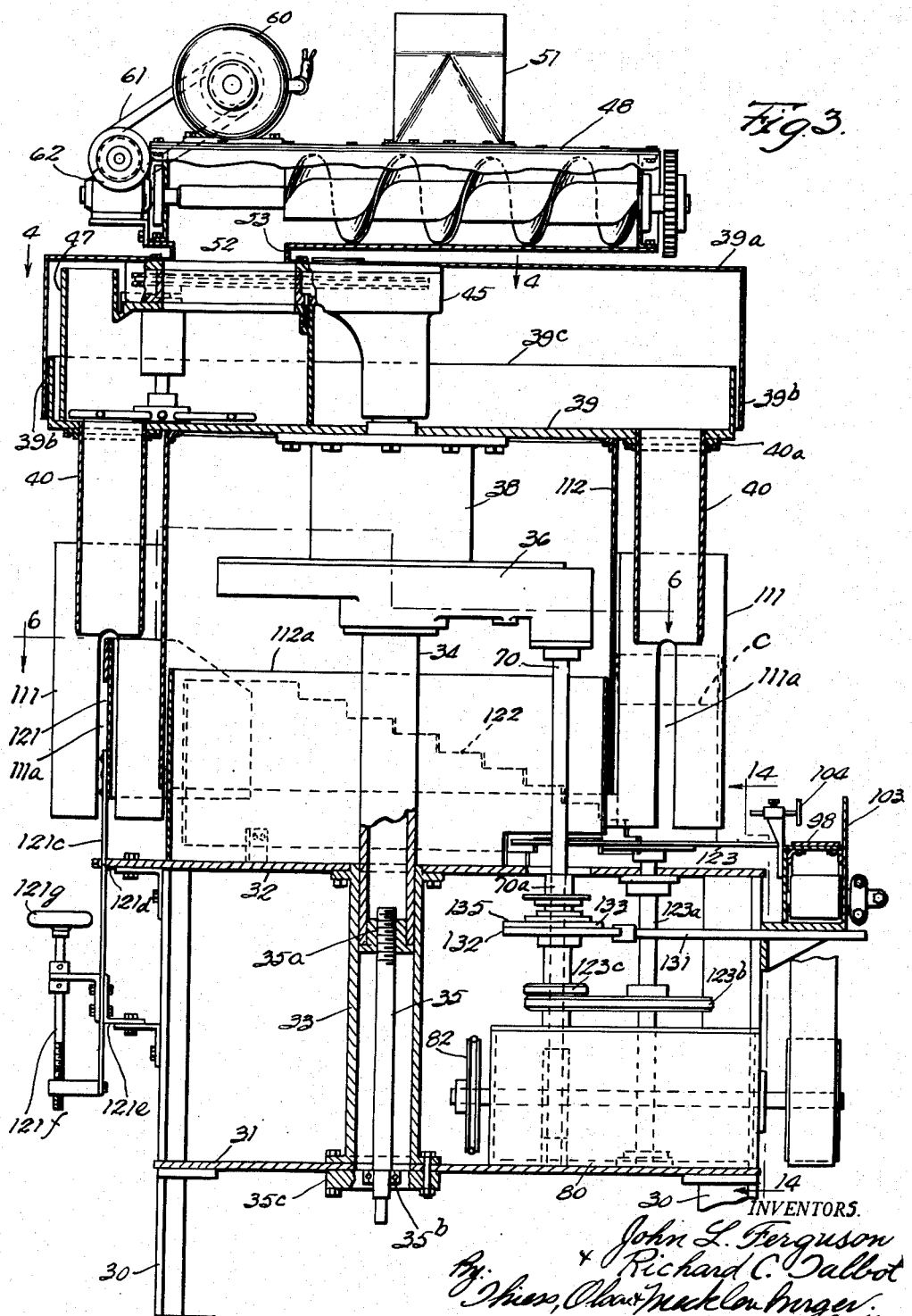
Fig. 3 is an elevational sectional view taken substantially on the line 3—3 of Fig. 2.
Figure 5:
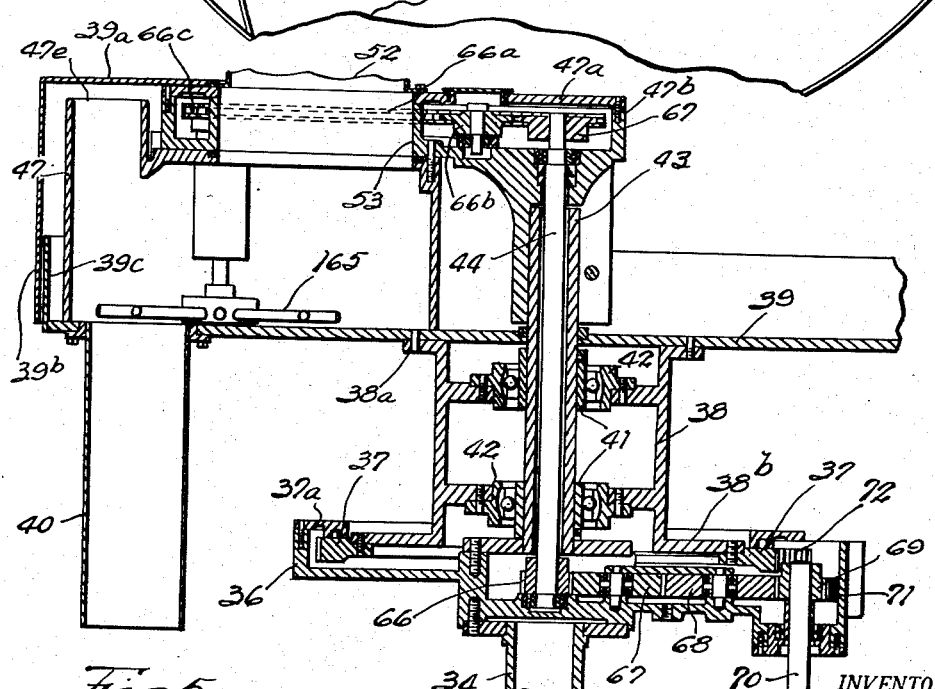
Fig. 5 is an elevational sectional view taken on the line 5—5 of Fig. 4, and shows in section the gears which rotate the upper portion of the apparatus and the product agitators.

The shaft 44 is operated by a gear train comprising gears 66, 67, 68 and 69, the latter being mounted on a drive shaft 70 which, as best shown in Figs. 3 and 5, extends vertically upward from a more fully hereinafter described central gear operating mechanism. A gear 71 also meshes with gear 68, being carried on a common shaft with gear 72, which in turn meshes with gear ring 37, which latter rotatably operates the hub 38 and the measuring tube carrying disc 39 mounted thereupon.

The central operating mechanism may be best understood by reference to Figs. 1, 3, 11, 12 and 13. A substantial portion of the operating gear mechanism is contained in a gear box or casing 80, mounted on the lower base plate 31 (see Figs. 1 and 3). A first shaft 81 is mounted in the end walls of box 80 and extends exteriorly thereof as shown at the left of Figs. 11 and 12, at which exterior location a V-belt pulley 82 is mounted upon the end of the said shaft. The pulley 82 is belt connected through belt 82a to drive pulley 82b on operating motor M (see Fig. 9) or any other desired primary source of power supply. A spur gear 83 is fixed to shaft 81 and engages with another spur gear 84 mounted on second shaft 85, the right hand of which latter is supported in the right hand wall of the gear box 80 and in a pillow block bearing 86 mounted on a vertically extending interior wall member 87 rising from the bottom of said box 80 (see Fig. 12). The shaft 85 has a beveled pinion gear 88 mounted on its left hand end, the latter meshing with bevel gear 89, pinned to the bottom of shaft 70. Said shaft 70 is carried by bearings 90 and 91 mounted within the box 80 as best shown in Fig. 12. Also mounted on the shaft 85 is a spur gear 92, meshing with another spur gear 93, which latter is pinned to a third shaft 94. Said shaft 94 is mounted in a bearing 95 on the right hand wall of the casing 80 and a pillow block 96 supported on the vertically extending wall 87. The shaft 94 extends outside of the box and carries a conveyor-operating pulley 97 at its outer end.

Figure 2:
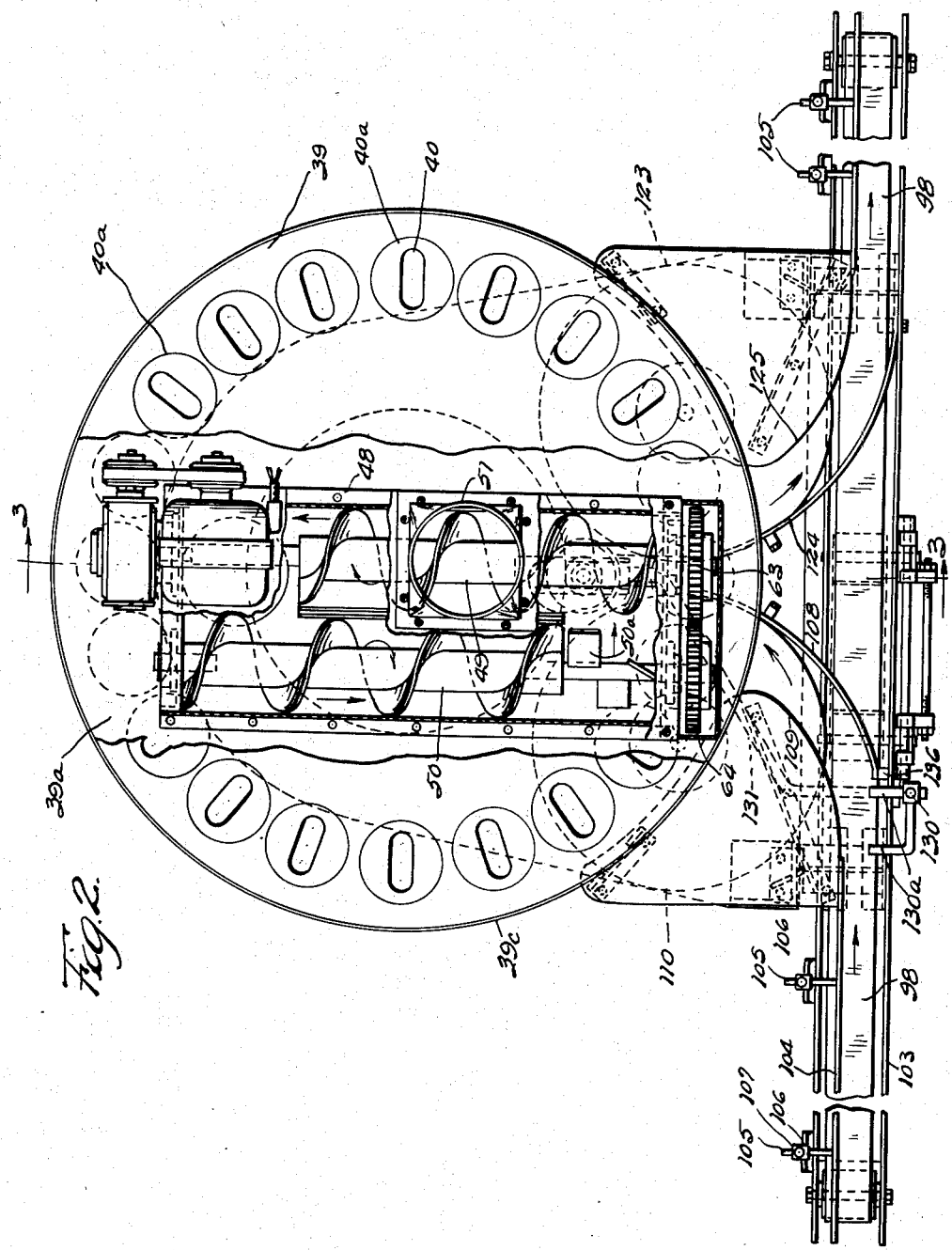
Fig. 2 is a plan view of the apparatus shown in Fig. 1 with certain portions of the apparatus being broken away to disclose certain elements thereof; the product-supply mechanism is not shown in Fig. 1 because of space limitations—it is, however, shown in the plan view of Fig. 2.

In Figs. 1, 2 and 3, the manner in which a conveyor 98 is driven by the pulley 97 is illustrated. The conveyor here shown—for purposes of illustration only—comprises a flexible belt type conveyor running over idlers 99, 100, 101 and 102, the idlers 99 and 102 being adjustable wherefrom the conveyor may be tightened as desired; it is not deemed necessary further to describe this type of belt tightening mechanism.

Containers or cans C are supplied to the left hand end of moving conveyor 98 (Fig. 1) from any convenient supply source and are progressed to the right between a front container guiding plate 103 and a rear guide rail 104 (best shown in Fig. 3). This guide rail 104 is mounted on studs 105 seated in brackets 106, wherefrom the rail 104 may be adjusted transversely of the conveyor by manipulation of set screws 107. As the cans are moved to the right (Figs. 1, 2 and 9), they are led into an inlet channel formed by an outer curved rail 108 and the curved edge 109 of a package retaining or guide plate. While so guided, the cans are picked up by rotating disc 110 and moved off of the conveyor 98 and into the path of package carriers 111 mounted on rotating drum 112, which latter is secured to the bottom of disc 39, and which package carriers are, therefore, moved in spaced relation to the measuring tubes 40 which are also secured to said disc 39. In order more completely to guard against intrusion centrally of the rotary portion of the machine, a lower drum 112a is arranged telescopically inside of drum 112 and is secured to the base plate 32.

It is frequently desirable, however, to cause the containers to abut against a stop prior to being fed onto the disc 110 and the drawings accordingly illustrate such a stop and timed means for pushing the forwardmost can off the stop and onto said disc, all of which will be described after a general description of the filling procedure has been given.

After the containers are engaged by said container or package carriers, they are moved into contact with the lower end of can-elevating cam track 120 (Fig. 7). As said containers are moved upwardly along the track 120 by the engagement of the package carriers 111 therebehind, the relative position of the containers and the measuring tubes 40 are changed gradually telescopically to project the containers upwardly around the measuring tubes which are associated therewith. When the can or container has been moved to the top of the track 120, the bottom of the measuring tube is against the bottom of the container, as will be more fully hereafter described. It is at that point that the open top of the measuring tube passes within the product supply or feeder chamber, whereupon the product passes into the measuring tube and, as soon as container is dropped slightly away from the tube bottom, the sealing material passes out of the tube and into the bottom of the container forming a seal around the bottom of the measuring tube, thereby to hold the product which is thereafter supplied to the tube from emerging from the bottom thereof.

The container bottom is thus dropped away from the tube bottom when the container passes onto adjustable cam track section 121. However, it should be realized that the track can be initially so set that said sealing material passes into the container immediately the upper open end of the tube comes under the supply chamber 47. In this case the upper edge of the adjustable track section 121 may be co-planar with the horizontal part of section 120.

During the time the can travels along the horizontal portion of the track 120 and of another track portion 121, the top of the measuring tube is passing under the material supply chamber to be completely filled. At about the end of the package travel along the horizontal portion of the track, the top of the measuring tube 40 passes from under the material supply chamber and the product is wiped off clean with the tube exactly full. Inasmuch as some material may leak out from under the vertical walls of chamber 47 and be carried on the rotating disc 39, a vertically-walled scraper 47a is secured to the chamber 47, being provided with a pocket-like vertical portion 47b. Accordingly, any material leaking out onto disc 39 will be carried in the direction of rotation thereof and will ultimately gather at pocket 47b whence it passes into the open upper end of a measuring tube as the latter is about to pass under the chamber 47. A stationary cover 39a (secured to housing 47) circular side wall 39b depending therefrom and a cooperating upstanding circular side wall 39c secured to and rotating with disc 39 inside of wall 39b prevent contamination of any material which thus leaks.

The container is next urged onto a descending stepped track member 122, and, accordingly, is bounced or jolted as it passes downwardly along the descending stepped portions of this track portion. Such jolting downward movement results in the gradual withdrawal relatively downwardly of the containers from the measuring tube 40. Thus, as the material which has been accurately measured into the tubes is fed into the containers, it is jolted in a packing motion thereby condensing the material sufficiently to not overflow the containers.

Before leaving this portion of the apparatus, it should be pointed out that the track section 121, comprising about one-half the horizontal part of the track, is secured to the machine in such manner that it is vertically adjustable. The said track portion 121 is movable in guides 121a and 121b secured to the inner surfaces of the track portions 120 and 122 and is mounted on a vertically extending adjusting arm 121c passing through top guide bracket 121d and bottom guide bracket 121e, both of the latter being secured to one of the vertical bed elements of the machine proper at the rear thereof. An adjusting screw 121f and a hand wheel (volume control adjusting screw) 121g, permit manipulation to vertically move the track portion 121. The distance between the bottom of the measuring tubes and the bottom of the container being filled may be increased so that a much greater amount of said product is permitted to pass out of the bottom of the measuring tube before the bottom of said tube is sealed by such initially deposited material. Thereafter the tube is, however, entirely filled with the product wherefrom as the containers are moved downwardly along the stepped track portion, a greater volume and/or weight as dictated by predetermined factors of product is deposited in the containers.

Following the progression of the filled containers off of the last step of the track portion 122, these containers rest upon a counter-clockwise (Fig. 2) rotating disc 123, which carries them out of the machine proper between a guide rail 124 and a guiding edge 125, the latter comprising the lower edge of a guide plate. As the packages are progressed outwardly through the outlet package channel formed by said guide portions 124 and 125, the filled packages are picked up by the moving belt conveyor 98 and are moved to the right as indicated.

It will be observed that the package carriers 111 are provided with slots 111a which permit these carriers to continue to move rotatably in engaging relation with the individual associated package as the latter are moved upwardly along track 120. Reference to Figs. 7 and 8 indicates that the slot is of sufficient depth from the bottom of the package carrier to the top thereof fully to accommodate the rise necessary to clear the uppermost part of track member 120.

The manner in which the bottoms of the measuring tubes are maintained in contact with the bottoms of the unfilled containers when such requirement is predetermined is shown in Fig. 1a wherein the tube and unfilled package, diagrammatically illustrated at the left, show how the horizontal portion of track section 120 produces such result. The middle showing in this same figure illustrates the manner in which the material flows out of the bottom of the measuring tube to form a seal at the bottom of the can, the seal in this case being very small, because only a small amount of material is permitted to flow out due to the position of the measuring tube bottom close to the can bottom. However, if the adjustable track section 121 is still further lowered (see right hand diagrammatic showing of Fig. 1a) a considerably larger amount of material can flow out and form said seal thereby to vary the amount of product which is ultimately placed in the right hand package.

In Fig. 1b, the measuring tube is shown as having a vertically adjustable sleeve section 40b adapted to be extended beyond the permanent bottom thereof. This section is secured by straps 40c to a securing ring 40d, which latter may be fixed in any desired vertically-adjusted position by the set screw 40e. The measuring tube may, by use of the adjustable sleeve 40b, be varied in length which feature is many times desirable in order to insure proper functioning of the measuring tube.

The inlet feed disc 110 and the outlet feed disc 123 are mounted on vertical shafts 110a and 123a, journaled in the lower and upper bed plates 31 and 32 (see Fig. 14). Pulleys 110b and 123b are fixed to the indicated shafts and are belt connected to pulleys 110c and 123c on shaft 70, whence the discs 110 and 123 are moved in proper direction to effect the infeed and outfeed of the empty and filled cans respectively.

Referring now to the infeed of unfilled packages in timed relation following abutment against a package stop (heretofore indicated as an alternative in feed operation) Figs. 2 and 9 most clearly show a container or package holding stop and associated mechanism.

An arm 130 is connected to the timing mechanism so that said arm may be moved transversely of the conveyor 98 to control the movement of the unfilled cans or containers toward the inlet channel, i. e., package pusher rods 130a (attached to said arm 130 and movable transversely of the conveyor) are positioned to engage a package at predetermined times and push it from stop 136. The vertical arm 130 is connected by a link 131 to the end of a cam follower 132 which is moved horizontally perpendicularly to the plane of the paper (Fig. 14) and parallel to the plane of the paper (Fig. 2). A cam 133 is mounted on a shaft 70a to engage cam roller 134 wherefrom the rotation of shafts 70 and 70a, in timed relation with the other operating instrumentalities, moves the stop arm 130 in predetermined timed relation to cause its associated pusher rods 130a (three being used—there is one directly under right hand rod 130a in Fig. 2—to insure proper three point contact against the face of a stopped container) to move a carton which has come to rest against stop 136 off of the latter. The latter extends inwardly from the outer rail 103 and holds up the container or unfilled package line until the timed package feed means pushes the right hand package toward disc 110. The cam 133 is associated with cam hub 133a which is secured to the shaft 70a while a collar 133b is secured to the shaft 70a on the left hand side (Fig. 16) of the cam follower 132. Splined vertically relatively movable shafts 70 and 70a are illustrated in Fig. 16—this shaft combination takes care of the movement of the upper part of the machine when adjusting screw 35 is used.

Referring more particularly to Fig. 9, attention is directed to package feeler lever 150 (extending into the package inlet channel) and feeler lever 151 (in position to be contacted under certain circumstances by the filled packages passing out through the package outlet channel). The manner of operation of these levers 150 and 151 will be best understood by reference to Fig. 9a, wherein the details of the operating instrumentalities associated with lever 150 are shown in greatly enlarged form.

The lever 150 is so positioned with respect to the containers and container moving or pushing members 111, that when an unfilled container is properly positioned with respect to each measuring tube 40, i. e., when there is an unfilled container under each of said tubes, the package-operated lever is held in position shown in Fig. 9 (by the above referred-to properly-positioned package) wherefrom the switch associated therewith is so maintained that the main operating circuit continues closed causing main operating motor to be continuously actuated and the apparatus to operate continuously. If, however, an unfilled container is not in position under a tube wherefrom the latter tube upon coming under the supply chamber 47, would spill the material supplied thereto out of the bottom of said tube with consequent wastage, the package feeler arm 150 will enter into the unoccupied space (where an unfilled container would normally be).

The feeler lever 150 forms one arm of a bell crank mounted on a pivot 150a, the other arm thereof being cam follower arm 150b provided with a cam follower roller 150c. A cam 150d has a flat side 150d'. The outer end of arm 150b operates the contact changing trip 150e of micro-switch 150f when the arm 150 is permitted (because of the absence of a container) to move downwardly (Fig. 9) into the unoccupied space. Arm 150 is so moved by spring 150g if the expected container is missing, whereupon switch 150f is opened and the machine stopped immediately wherefrom the tube-lacking measuring tube is not moved into product receiving position under feeder housing 47. However, even when a container is missing the arm 150 is established in potential feeler position, i. e., capable of entering an unoccupied container space, only at certain synchronized times (when a package occupied zone is opposite said arm 150) i. e., only when roller 150c is opposite the flat side of cam 150d.

At other times during the rotation of cam 150d, the circular portion thereof prevents the movement of arms 150 and 150b irrespective of whether or not something holds arm 150 in the position shown in Fig. 9. In other words, the feeler arm 150 is deliberately arranged to be responsive (and therefore apparatus stopping) only when the container-occupied space between the package carriers 111 is enterable by said arm 150. At all other times, while the carriers are passing said arm, it is held in switch closing position by the circular edge of cam 150d.

There is also the possibility that through some misadventure, a filled container will not move properly vertically or otherwise with respect to its associated filling tube. This causes jamming in the automatic operation of the machine with consequent necessity of immediately stopping the machine until the fault can be remedied and/or the jammed package cleared from the machine, since otherwise the latter would be carried with its associated tube over into the container supply area with consequent possible serious damage. It is, accordingly, essential that such control means shall be provided as will insure the stoppage of the machine before a jammed or otherwise improperly carried filled container can cause the indicated damage.

Accordingly, lever 151 is so positioned as to detect the presence of such improperly carried filled container. When trouble occurs on the filled-container or exit side of the machine, the detector lever 151 is moved against a spring 151a to change the position of associated bell crank switch-operating arm 151b to cause proper cessation of the apparatus cycle, the latter arising from relay opening of the main circuit caused by the moving of the switch contact 151c associated with lever 151b.

Alternative controls for the foregoing purposes may take the form of suitable electric eye devices, the construction and operation of which are well known.

The heretofore described filling apparatus lends itself readily to a still further control of the accurately measured amounts of product which are placed in containers supplied thereto. The simplicity of the drive, i. e., the shaft 70 making one revolution per second for each of the cans to be handled by the machine provides a basis for such control. If 80 cans or containers per second are to be handled by the machine, the shaft rotates at 80 R. P. M. The variation in machine speed (and consequent unpredictable variation in amount of product filled) arising from changes in electric line power has long been the bane of this type of apparatus, but no machine heretofore known has been so built that a constant speed (and consequent measuring accuracy) feature could be patentably combined therewith. In the present case, however, a speed counter can be operatively associated with aforesaid shaft. When a variation in speed occurs, the connection from the speed counter through any well-recognized constant speed device enables one to take care of the speed variation. A synchronous motor may be used as a speed regulator which would drive the apparatus at a constant speed irrespective of power fluctuations. A valuble feature, therefore, of the herein-described apparatus is the ability to use constant speed control therein so that the careful measurement secured by the other precision factors of the machine will not be in any wise affected by unforeseen and unpredictable changes in electrical line power.

Having referred to the manner of and reasons for certain operations during the description of the apparatus, it is deemed unnecessary elaborately to repeat the already given filling method and manner of operating a machine in the practice of such method. Suffice to say that the method of securing a satisfactory accurately measured filling of containers in the manner illustrated herein is believed novel. The cross-section of the measuring tubes is substantially coterminous with the inside transverse cross-section of the can or container which is telescoped therewith. This method comprises permitting a predetermined amount of product initially to be deposited in the about-to-be filled container in such amount as accurately to seal the bottom of the measuring tube and permit the accurate measurement of a predetermined amount of product without having to employ a completely closed measuring member with the attendant shortcomings of the same.

Broadly speaking, the novel method comprises closing the bottom of a measuring tube by telescopically moving the container upward until the container bottom contacts the outlet end of measuring tube, thus sealing the exit end of measuring tube, partially filling the measuring tube while on horizontal portion of track section 120, and completely filling the measuring tube while on slightly lower horizontal portion of adjustable track section 121. While on track 121, the spacing between bottom of measuring tube and bottom of container is sealed by the product. This spacing is determined by a predetermined volume of product to be measured. Fig. 1a illustrates the extent to which this initially deposited material may vary, i. e., the extent to which the so-called sealing product may be changed to impart a high degree of flexibility to the measuring step. The filling method next contempaltes permitting the product to be deposited in the substantially empty container (it is so referred to even though the tube-bottom— during the tube filling phase—may stand well above the container bottom) in a series of combined filling and packing or settling movements (while descending the steps of track section 122). The method is controllable also with respect to the latter steps by conforming the vigor of packing with the settling or packing characteristics of the product being filled into the containers. This is made possible by a predetermination of the number of steps in the descending track portion, the relative dwell of the container on each step and the violence of the impact (which is based on the amount of drop from step to step) and the consequent condensing or product packing effect.

The product is initially fed into the screw conveyor chamber 48 whence it is supplied to the feeder chamber or housing 47, in which latter the agitators 65 and 66 are continuously rotated to insure that as the open upper end of each measuring tube 49 passes within and becomes in fact a part of the bottom of the product supply chamber 47, the material will descend through the measuring tube and the hereinbefore described sequence of events will occur. The manner in which the containers are progressed smoothly up the supply track to telescope the measuring tubes by the containers associated with the particular tube has already been fully explained and, in the same manner, the way in which the filled containers are bumped or jolted in product packing manner down the packing or stepped exit track has been described.

Having already described the operation of the various drive, feed, stop and control mechanisms, these latter will not again be discussed.

A variation of the filling method described in connection with previously described apparatus enables the packing of a wide variety of what may be termed "loose materials" into containers in a desirably closely compacted manner. This method of packing is here described in connection with the machine elements available in the presently described machine. It will, however, be understood that other operating instrumentalities may be employed to practice this method; several of such instrumentalities will be referred to hereafter.

The essential characteristic of the about-to-be described novel container packing method involves the more or less continuous ("frequently intermittently" may be the more acceptable term) tamping of the material in the container as it is fed into said container. A further alternative (but not necessarily always associable) feature of the new filling method involves tamping the product being supplied to the container by the filling means or spout or tube. The alternativeness of these factors is emphasized because the tamping may be accomplished by a means which is separate from the filling spout itself, for instance, a toroidal member may surround the filling tube, or the material may be filled into the container through a toroidal cross section tube and the tamping means be positioned centrally of said filling tube.

In any event, the method of filling whereby the material is intermittently tamped as it is fed into the container is here practiced by causing the stepped plate 122 which supports the containers, as they are progressively lowered out of telescopic relation with the measuring tubes 49, to be moved intermittently vertically so that a number of tamping operations, i. e., relative vertical movements between the containers and filling tubes, are performed while the containers are being completely filled and while the tubes are being progressively withdrawn from telescopic relation. It is not deemed necessary to describe in detail a connection between the crank 122e shown in Fig. 17 as attached to the stepped track member illustrated therein and/or the driving means which are attached thereto. Suffice to say that a crank or equivalent means is properly moved from the main operating power source of the machine to the end that the stepped plate is moved vertically as the containers are pushed (by carriers 111) down the stepped track 122. Note that this track section 122 has been straightened out for purposes of ready illustration—in reality it will conform to the curve shown in Figs. 6 and 10. The up-and-down movement of the track section causes the partially filled containers to be moved vertically with respect to the measuring tubes thereby resulting in said tubes (particularly the ends thereof) imparting a tamping action to the material as it is filled into the containers.

This novel method may also be performed in a slightly different manner by causing the filled containers to move onto a vertically reciprocable plate 122a (Fig. 18) after the measuring tubes have been almost entirely withdrawn relatively upwardly from the containers by reason of the latter descending along a downwardly directed track as shown. This plate 122a is moved vertically (again by crank 122e which is properly connected to a source of power) to cause the measuring tubes which still project partially into the cans on said plate to tamp the material in a plurality of containers or cans simultaneously as the latter are progressed over the plate by the carriers 111. The plate 122a may be varied in size to accommodate any number of cans.

While the just referred to novel packing method is described as using the measuring tube end as a tamping instrument, it will be understood that the said novel method may also be carried out by causing relative vertical movement between the lower end of a supply hopper filling a single container or any one of a number of similarly positioned containers and the filling means therefor, whereby the requisite intermittent relative movement between the element which tamps the material and the can or container itself may be effected.

A variation in the product supply and feed screw and agitator portions of the machine is shown in Figs. 19 and 20 the purpose of this alternative structure being to reduce the amount of structural mechanism heretofore described as being used in this apparatus for such purpose. Instead of placing screw conveyors 49 and 50 in a separate overhead casing 46 initially to receive the material from the source and then feed it into another underlying and separate agitator-containing feed or supply chamber (like 47) wherein such material is continuously agitated, screw conveyors may be positioned directly in the feed chamber 47. When the latter structure is employed, the agitators are dispensed with and the continuity of feed to, and desired product pressure head on, the measuring tubes are insured by incorporating the screw conveyors directly in the feed chamber.

In the alternative feeder apparatus of Fig. 19, a drive member such as a chain 200 passes around driving sprockets 201 and 202, and is caused to run in an arcuate path (having the same radius as the travel path of the open measuring tube tops) by being contained in guides 203 of proper shape. Agitator members or paddle-like material-moving fins 204 are mounted on the drive chain 200. The sprockets 201 and 202 may be mounted to be driven by the same mechanism which drives the agitators in the first described feeder agitator assembly. The association of chain 200 with the curvate guides 203 causes the paddles to pick up the material supplied through overhead inlet conduit 205 and progress it into the curvate space extending above the upper open ends of the measuring tubes as the latter are passed under product supply chamber 47.

Fig. 20 illustrates a further alternative structure wherein flexible shafts 206 and 207 are mounted within the supply or feed chamber 47, with their longitudinal or drive dimension conforming to the curved path of movement of the open tops of the measuring tubes under the chamber 47. Flexible flights or worm sections 208 are secured to said shafts and, because of the curved disposition of the flexible shafts, move the material in the same manner as heretofore described in connection with Fig. 19.

Fig. 21 illustrates a variation in structure which may at times be used with marked advantage. For instance, when it is desired that the filled containers be returned to the same general area whence the unfilled containers came, this end can, of course, be achieved by a somewhat complicated return conveyor, but the about to be described inclusion directly in the conveyor portion of the machine itself of desirable means to accomplish this end is thought to be novel. Fig. 21 illustrates such apparatus in a more or less exemplary manner, although the structure is so shown that it may be built from the here-included illustration.

As the description proceeds, it will be observed that this particular type of expedited return of the filled containers to the same area whence they were supplied in unfilled condition permits the use of the hereinbefore described combined supply and tamping of the material during the container filling in a desirable manner. Thereafter, when the containers have been fully withdrawn from telescoping relation with the measuring tubes, they are further vertically moved sufficiently downwardly so that they clear the bottom of the conveyor which supplies the unfilled containers to the machine. During this additional descent, the filled containers may be tamped by tamping means independently of the measuring tubes. While Fig. 21 shows the filled containers entering or being fed into the telescoping-type volumetric filler at one level and the filled containers being discharged at a lower level by a conveyor positioned directly below the infeed or supply conveyor, it will be understood that the invention does not require such one-immediately-over-the-other positioning of the inlet and outlet conveyors. For instance, the discharge conveyor may be displaced laterally with respect to the supply conveyor, and may be either on the lower level as shown in Fig. 21, or might even be on the same level as the supply conveyor and interference with the latter be avoided by proper lateral displacement of the conveyors.

It is deemed necessary only exemplarily to illustrate the just-referred to conveyor structure, the same being understandable by reference to said Fig. 21 showing alone. However, it should be realized that the various combinations therewith of the other more detailed illustrated apparatus features are productive of many patentably novel combinations, as will appear from one or more of the appended claims.

Obviously the hereinbefore described invention may assume various not-illustrated forms, and accordingly it is not limited by any foregoing specific embodiment of a successfully tested machine but only by the appended claims interpreted in light of the prior art.

Having thus described the invention, what is claimed and desired to be secured by Letters Patent is:

1. In a container filling machine, product supply means, measuring tubes adapted to be filled from said supply means, means for moving empty containers into telescoping association with said tubes so that the latter project down into said containers, means for completely filling each measuring tube after it has been individually projected into an associated empty container and while the lower open ends of said tubes are maintained closed initially against the container bottoms and subsequently against an initially deposited predetermined amount of tube-end sealing product, and means for withdrawing the measuring tubes from the contaainers with consequent supply of the tube-measured products into said containers.

2. In a container filling machine, product supply means, measuring tubes adapted to be filled from said supply means, means for moving empty containers into telescoping association with said tubes so that the latter project down into said containers, means for completely filling each measuring tube after it has been individually projected into an associated empty container and while the lower open ends of said tubes are maintained closed, means for withdrawing the measuring tubes from the containers with consequent supply of the tube-measured product into said containers, said supply means including an open-bottom product-containing chamber and product conveyors for insuring a constant product head in said chamber, and a disc adapted to rotate under and close the bottom of said chamber, said measuring tubes depending from said disc.

3. In connection with a product-filling means, the method of insuring accurate filling of loose products of varying characteristics into containers which comprises sealing the outlet of the filling means by initially depositing a predetermined quantity of product into the container, thereafter measuring the quantity ultimately necessary to complete filling the container, and adjustably controlling the amount of sealing product in accordance with the characteristics of said product.

4. In connection with a product-filling means, the method of insuring accurate filling of loose products of varying characteristics into containers which comprises sealing the outlet of the filling means by initially depositing a predetermined quantity of product into the container, then measuring the quantity ultimately necessary to complete filling the container, adjustably controlling the amount of sealing product in accordance with the characteristics of said product, and subjecting the product in said container to an intermittent mechanical compacting action as dictated by the packing and/or settling characteristics of the product.

5. In a container filling machine, a can supply and withdrawal means comprising a conveyor, a rotatable measuring tube assembly including can carriers, an ascending and descending track having a horizontal portion and along which track cans are moved by said can carriers in bodily telescoping and untelescoping relation with said tubes, said tubes extending into said cans and to points adjacent the bottoms of the cans and into sealing relation therewith when the latter are on said horizontal portion, said product supply having provision for filling the tubes completely while so extending and for filling the cans with the said product from said tubes while the cans are on the descending portion of the track.

6. In a container filling machine, product supply means, a rotatable member, a plurality of open-ended measuring tubes depending from said rotatable member, a track having an elevating portion, a horizontal portion and a lowering portion and container engaging means for moving the containers along said track synchronously with the rotatory movement of said tubes to project said tubes bodily and relatively downwardly into the containers and sealing their lower ends and so maintain them while product enters the tubes and thereafter to lower the containers and deposit the material in the tubes in said containers.

7. In a container filling machine, product supply means, a rotatable member, a tube-carrying disc mounted on said member, a plurality of open-ended measuring tubes mounted on and depending from said disc, the upper open ends of the tubes being movable under said product supply, a track having an elevating portion, a horizontal portion and a lowering portion and container engaging means for moving the containers along said track synchronously with the rotatory movement of said tubes to project said tubes bodily and relatively downwardly into the containers and sealing their lower ends and so maintain them while product enters the tubes and thereafter to lower the containers and deposit the material in the tubes in said containers.

8. In a container filling machine, filling means through which product is fed into a container, and means for moving said filling means relatively to the container to tamp said product as the latter is deposited in the container by an intermittent mechanical compacting action.

9. In a container filling machine, product supply means, a rotatable member, a tube-carrying disc mounted on said member, a plurality of open-ended measuring tubes mounted on and depending from said disc, the upper open ends of the tubes being movable under said product supply, a track having an elevating portion, a horizontal portion and a lowering portion, container engaging means for moving the containers along said track synchronously with the rotatory movement of said tubes to project said tubes relatively downwardly into the containers and so maintain them while product enters the tubes and thereafter to lower the containers and deposit the material in the tubes in said containers, and means for vertically reciprocating the containers during the filling operation to tamp the container filling product.

10. In a container filling machine, product supply means, a rotatable member, a tube-carrying disc mounted on said member, a plurality of open-ended measuring tubes mounted on and depending from said disc, the upper open ends of the tubes being movable under said product supply, a track having an elevating portion, a horizontal portion and a lowering portion, container engaging means for moving the containers along said track synchronously with the rotary movement of said tubes to project said tubes relatively downwardly into the containers and so maintain them while product enters the tubes and thereafter to lower the containers and deposit the material in the tubes in said containers, and means for vertically reciprocating the containers during the filling operation to cause the measuring tubes to tamp the container filling product.

11. In a container filling machine, product supply means, a rotatable member, a tube-carrying disc mounted on said member, a plurality of open-ended measuring tubes mounted on and depending from said disc, the upper open ends of the tubes being movable under said product supply, a track having an elevating portion, a horizontal portion and a lowering portion, container engaging means for moving the containers along said track synchronously with the rotatory movement of said tubes to project said tubes relatively downwardly into the containers and so maintain them while product enters the tubes and thereafter to lower the containers and deposit the material in the tubes in said containers, and means for vertically reciprocating the containers following the filling operation to cause the measuring tubes to tamp the container filling product.

12. In an apparatus comprising an open-ended measuring tube projectable into a container, the method of filling the container with an accurately predetermined amount of loose product which comprises combining an initially deposited adjustably controlled amount of product serving to seal the bottom end of said tube and subsequently filling said tube full of product and depositing the same to eventuate the total product filled into said container.

13. In an apparatus comprising an open-ended measuring tube projectable into a container, the method of filling the container with an accurately predetermined amount of loose product which comprises initially depositing a predetermined amount of product into said container, which amount has been measured by causing the bottom of said tube to be removed a product-measuring distance from the bottom of said container, causing said initially deposited product to seal the bottom of said filling tube, then measuring said tube-full of product, and finally adding said tube-full of product to the initially deposited product.

14. In a filling machine for filling a merchandising container with loose product material, a measuring tube, means for continuously supplying product to said tube during a fixed predetermined time, means for telescopically relating a container to said tube to close the bottom of said tube, said tube substantially filling the container transversely, means for relatively moving said tube and container following the initiation of said fixed time to such fixed relative positions that some product is permitted to pass out of and seal the bottom of said tube during the remainder of said fixed time thereby causing said tube to become completely filled.

15. In a container filling machine for filling merchandising containers with loose product material, product measuring tubes adapted to be positioned to project a predetermined distance into the containers while said tubes are being filled with product, said tubes substantially filling said containers transversely and vertically when so positioned, said distance being a main factor of the total amount of product ultimately filled into the containers, and means for varying said distance.

16. In a merchandising container filling machine, product measuring tubes adapted to be projectable varying predetermined distances into the containers while said tubes are being filled with product, said projection distance being a factor of the total amount of product ultimately filled into the containers, means for varying said projection distances, means for supplying product to said tubes and filling the same after the containers and tubes have been relatively telescopically moved to project the tubes said predetermined distance into said containers and thereby measuring the quantity of product to go into the respective containers, and mechanism for causing the containers to envelop said tubes in the indicated manner.

17. In a merchandising container filling machine, product measuring tubes adapted to be projectable varying predetermined distances into the containers while said tubes are being filled with product, said projection distance being a factor of the total amount of product ultimately filled into the containers, means for varying said projection distances, means for supplying product to said tubes and filling the same after the containers and tubes have been relatively telescopically moved to project the tubes said predetermined distance into said containers and thereby measuring the quantity of product supplied to each container, and mechanism for causing the containers to envelop said tubes in the indicated manner for then maintaining said tubes at said fixed distance during the complete filling of said tubes and for thereafter separating said tubes and containers to deposit the tube-full of product into the container as the latter is thus moved.

18. In a merchandising container filling machine, product measuring tubes with open upper ends adapted to be projectable varying predetermined distances into the containers while said tubes are being filled with product through said upper ends, said projection distance being a factor of the total amount of product ultimately filled into the containers, means for varying said projection distances, the cross-section of said tubes conforming sufficiently closely to the cross-section of the container being filled to permit air only to escape between the outside of the tube and the inside of the container during the filling process and the tubes in said machine being changeable to permit said cross-sectional conformation.

19. In a merchandising container filling machine, a product supply, open-ended measuring tubes receiving product through said open ends from said supply and adapted to be projectable variable predetermined distances into the containers while said tubes are being filled with product, said projection distance being a factor of the total amount of product ultimately filled into the containers, means for varying said projection distances, the cross-section of said tubes conforming sufficiently closely to the cross-section of the container being filled to permit air only to escape between the outside of the tube and the inside of the container during the filling process and at the same time being predetermined by volume and/or weight of product to be filled into said containers, and the tubes in said machine being changeable to permit said cross-sectional conformation and said volume and/or weight predetermination.

20. In a container filling machine, a product supply, open-ended measuring tubes receiving product through their upper ends from said supply and adapted to be projectable variable predetermined distances into the containers while said tubes are being filled with product, said projection distance being a factor of the total amount of product ultimately filled into the containers, means for varying said projection distances, and means for initially depositing sufficient product into said container to fill the latter up to the bottom of said tube and permit the complete filling of said tube above said seal before said tube-full of product is also deposited in said container, said last-named means comprising timing mechanism for bringing said tube under said product supply only after said tube and container have been established in said predetermined relation and for thereafter separating said tube and container only after the tube has passed from under said product supply.

21. In a container filling machine, product measuring tubes adapted to be projectable varying predetermined distances into the containers while said tubes are filled with product, said projection distance being a factor of the total amount of product ultimately filled into the containers, means for varying said projection distances, means for supplying product to said tubes after the containers and tubes have been relatively telescopically moved to project the tubes said predetermined distance into said containers, and mechanism for causing the containers to envelop said tubes in the indicated manner for maintaining said tubes at said fixed distance during the complete filling of said tubes and for thereafter separating said tubes and containers to deposit the tube-full of product into the container as the latter is thus moved, said mechanism including means for moving said tubes constantly in a horizontal plane and a container cam track for elevating said containers telescopically to cause said tube projection into said containers and to cause said containers to be maintained in said plane during complete tube filling and measuring and for moving said containers and tubes apart after each tube has been thus filled.

22. In a container filling machine, product measuring tubes adapted to be projectable varying predetermined distances into the containers while said tubes are filled with product, said projection distance being a factor of the total amount of product ultimately filled into the containers, means for varying said projection distances, means for supplying product to said tubes after the containers and tubes have been relatively telescopically moved to project the tubes said predetermined distance into said containers, and mechanism for causing the containers to envelop said tubes in the indicated manner for maintaining said tubes at said fixed distance during the complete filling of said tubes and for thereafter separating said tubes and containers to deposit the tube-full of product into the container as the latter is thus moved, said mechanism including means for moving said tubes constantly in a horizontal plane, and a container cam track for elevating said containers telescopically to cause said tube projection into said containers and to cause said containers to be maintained in said plane during complete tube filling and measuring and for moving said containers and tubes apart after each tube has been thus filled, said means for supplying product to said tubes including a product supply chamber overlying said tubes when said containers are on the horizontal plane portion of said container cam track and adapted to supply product to the open upper ends of said tubes as the latter move beneath said chamber for both said initial sealing deposit and said subsequent measuring tube filling.

23. In a container filling machine, product measuring tubes adapted to be projectable varying predetermined distances into the containers while said tubes are filled with product, said projection distance being a factor of the total amount of product ultimately filled into the containers, means for varying said projection distances, means for supplying product to said tubes after the containers and tubes have been relatively telescopically moved to project the tubes said predetermined distance into said containers, mechanism for causing the containers to envelop said tubes in the indicated manner for maintaining said tubes at said fixed distance during the complete filling of said tubes and for thereafter separating said tubes and containers to deposit the tube-full of product into the container as the latter is thus moved, said mechanism including means for moving said tubes constantly in a horizontal plane and a container cam track for elevating said containers telescopically to cause said tube projection into said containers and to cause said containers to be maintained in said plane during complete tube filling and measuring and for moving said containers and tubes apart after each tube has been thus filled, said means for supplying product to said tubes including a product supply chamber overlying said tubes when said containers are on the horizontal plane portion of said container cam track and adapted to supply product to the open upper ends of said tubes as the latter move beneath said chamber for both said initial sealing deposit and said subsequent measuring tube filling, said tubes being open at both ends, and a tube carrying disc through which the open upper tube ends project, the bottom of said chamber being closed by said tube carrying disc wherefrom movement of the open upper tube ends under said chamber causes product supply to said tubes.

24. In a container filling machine, container filling means including container carriers, means for moving containers to be engaged by said carriers, means for filling said containers, means for withdrawing said containers from the filling means, and detecting means alongside said withdrawal means having a movable detecting arm adjacent the path of normally withdrawn containers on said withdrawal means, said arm being engageable and movable by faultily withdrawn containers on said withdrawal means, for stopping said machine when said withdrawal is faulty.

25. In a container filling machine, container filling means including container carriers, means for placing containers in proper position to be engaged by said carriers and thereafter carried through said machine, means for withdrawing said containers from the filling means, and means timed to be detectably operative only when a container should be in a predetermined position upon entry and timed to detect a misplaced container upon withdrawal for stopping the machine when either the feed or withdrawal of the containers is faulty.

26. In a container filling machine, an open-bottomed product supply chamber, a rotatable member movable under said chamber to close the bottom thereof, a plurality of open-ended measuring tubes mounted on and depending from said rotatable member, the open upper ends of the tubes being carried under said product chamber for filling therefrom as said rotatable member is moved, a product supply means connected to said chamber, and product conveyor means located in said supply chamber having means to move the product therein into the curved path in which the upper open ends of the measuring tubes are moved and to maintain a predetermined constant head of product above said open upper tube ends.

27. In a container filling machine, an open-bottomed product supply chamber, a rotatable member movable under said chamber to close the bottom thereof, a plurality of open-ended measuring tubes mounted on and depending from said rotatable member, the open upper ends of the tubes being carried under said product chamber for filling therefrom as said rotatable member is moved, a product supply means connected to said chamber, and product distribution means within said supply chamber having means to maintain a predetermined constant head of product above said open upper tube ends.

28. In a container filling machine, an unfilled container feed-in conveyor, container carriers operable to carry the containers through filling mechanism, means for stopping the in-fed container line on said feed-in conveyor, and means controlled by the rotation of the machine and the approach of a container-engaging carrier for one-by-one releasing the stopped containers and moving them toward associable container carriers.

29. In a method of filling containers with a product from open-ended measuring tubes, the method of adjustably controlling the quantity of product deposited in said container comprising locating the tubes substantially within the containers and adjustably setting the height of the bottom of said tubes with respect to the bottom of said containers, filling said tubes with said product while so located, and then removing said tubes from said containers and depositing the contents thereof in said containers and filling the same.

30. In a filling machine, an open-ended measuring tube, means for continuously supplying product to said tube during a fixed predetermined time, during which time said tube is located substantially within a container, means for maintaining the exit end of said tube at a predetermined distance from the bottom of said container thereby permitting product to be deposited in said container up to the exit end of said tube to partially fill said container and to seal the exit end of said tube, means for thereafter permitting said tube to be completely filled during the remainder of said fixed time and while its exit end is so maintained, and means for emptying said tubefull of product into said container filling the same after expiration of said fixed time.

31. In a container filling machine, container filling means including container carriers, means for placing containers in proper position to be engaged by said carriers and thereafter carried through said machine, stop means for the machine including a container-engageable feeler arm movable into the path of the containers at said proper position, and timing mechanism controlling said arm for positioning it at said proper position when a container is due to arrive thereat and maintaining said arm out of the container path at other times, said arm causing said stop means to stop the machine if a container is not engaged by said arm in said proper position.

32. In a container filling machine, an open-bottomed product supply chamber, a rotatable member movable under said chamber to close the bottom thereof, a plurality of open-ended measuring tubes mounted on and depending from said rotatable member, the open upper ends of the tubes being carried under said product chamber for filling therefrom as said rotatable member is moved, and product supply means for maintaining said product chamber in filled condition, said last-mentioned means including apparatus for advancing said product to a filling opening in said chamber and apparatus for withdrawing excess quantities of said product from said filling opening.

33. In a container filling machine, an open-bottomed product supply chamber, a rotatable member movable under said chamber to close the bottom thereof, a plurality of open-ended measuring tubes mounted on and depending from said rotatable member, the open upper ends of the tubes being carried under said product chamber for filling therefrom as said rotatable member is moved, product supply means for maintaining said product chamber in filled condition, said last-mentioned means including apparatus for advancing said product to a filling opening in said chamber and apparatus for withdrawing excess quantities of said product from said filling opening, and product distribution means within said supply chamber for agitating said product thereby to maintain a continuous supply of product above said open upper tube ends.

34. In a container filling machine, a moving unfilled container feed-in conveyor, container carriers operable to carry the containers through filling mechanism, an obstruction at the inner end of the conveyor in the normal path of the in-fed container line on said feed-in conveyor for stopping said line, and container pusher means adjacent said obstruction to engage and laterally push the forward container of said stopped line free from said obstruction, said pusher means being controlled by the rotation of the machine and the approach of a container-engaging carrier for one-by-one releasing of the stopped containers for successive movement toward the carriers and in timed relation thereto.

35. For use in a merchandising container filling machine, filling means through which product is fed into a container, and means for maintaining the lower end of said filling means constantly above the level of the product in said container and for relatively moving said filling means to impart intermittent mechanical tamping operations to the product in said container.

36. For use in a merchandising container filling apparatus including a filling means projecting into the container, the method of facilitating the container filling which comprises imparting intermittent mechanical tamping operations to the product with the filling means as the container is being filled.

37. For use in a merchandising container filling apparatus including a filling means projectable into a movable container, the method of facilitating the filling of a container with a product which comprises utilizing the filling means as a tamping device for imparting an intermittent mechanical tamping action to the product in the container during the filling operation and utilizing the movement of the container to provide a product settling action during the said filling operation.

38. In a filling machine for filling loose material into merchandising containers, an open-ended measuring tube adapted to measure the product necessary to fill the container, means for continuously supplying the product to said tube during a fixed predetermined time, during which time said tube is located substantially within a container, means for maintaining the exit end of said tube at a predetermined distance from the bottom of said container thereby permitting a predetermined quantity of product to be deposited in said container to form an end closure for said measuring tube, means for thereafter permitting said tube to be completely filled during the remainder of said fixed time, and means for emptying said tube-full of product into said container after the expiration of said fixed time.

References Cited in the file of this patent
UNITED STATES PATENTS

| Number | Name | Date |
| --- | --- | --- |
| 223,522 | Locke | Jan. 13, 1880 |
| 578,944 | Platz et al. | Mar. 16, 1897 |
| 872,161 | Whitehorn | Nov. 26, 1907 |
| 1,049,029 | Adjornsson et al. | Dec. 31, 1912 |
| 1,483,861 | Heulings | Feb. 12, 1924 |
| 1,790,626 | Menninger et al. | Jan. 27, 1931 |
| 1,791,654 | Belcher | Feb. 10, 1931 |
| 1,828,936 | Miller | Oct. 27, 1931 |
| 1,860,720 | Norgaard | May 31, 1932 |
| 1,893,831 | Weber | Jan. 10, 1933 |
| 2,055,075 | Gardner | Sept. 22, 1936 |
| 2,103,817 | Johnson | Dec. 28, 1937 |
| 2,156,271 | Beck | May 2, 1939 |
| 2,232,273 | Risser | Feb. 18, 1941 |
| 2,340,637 | Bauer | Feb. 1, 1944 |
| 2,366,811 | Sibson et al. | Jan. 9, 1945 |
| 2,433,061 | Pearson et al. | Dec. 23, 1947 |
| 2,533,986 | Atterbury | Dec. 12, 1950 |